United States Patent
Meyer

(10) Patent No.: US 8,115,462 B2
(45) Date of Patent: Feb. 14, 2012

(54) VOLTAGE REGULATOR FOR AN INTEGRATED CIRCUIT

(75) Inventor: Daniel Meyer, Woodstock, MD (US)

(73) Assignee: Atmel Corporation, San Jose, CA (US)

( * ) Notice: Subject to any disclaimer, the term of this patent is extended or adjusted under 35 U.S.C. 154(b) by 276 days.

(21) Appl. No.: 11/765,805

(22) Filed: Jun. 20, 2007

(65) Prior Publication Data

US 2008/0315848 A1 Dec. 25, 2008

(51) Int. Cl.
*G05F 1/59* (2006.01)
*H02M 3/18* (2006.01)

(52) U.S. Cl. ........... 323/272; 323/284; 327/536; 363/60

(58) Field of Classification Search .................. 323/271, 323/283, 284, 269, 272; 363/60; 327/536
See application file for complete search history.

(56) References Cited

U.S. PATENT DOCUMENTS

| | | | |
|---|---|---|---|
| 5,548,204 A | 8/1996 | Armstrong, II et al. | |
| 5,982,222 A * | 11/1999 | Kyung | 327/536 |
| 6,255,886 B1 * | 7/2001 | Manning | 327/325 |
| 6,275,096 B1 * | 8/2001 | Hsu et al. | 327/535 |
| 6,366,224 B2 | 4/2002 | Cliff et al. | |
| 6,486,728 B2 * | 11/2002 | Kleveland | 327/536 |
| 6,653,888 B2 * | 11/2003 | Lee | 327/534 |
| 6,654,306 B2 * | 11/2003 | Merritt et al. | 365/226 |
| 6,894,471 B2 | 5/2005 | Corva et al. | |
| 7,023,191 B2 | 4/2006 | Bernacchia et al. | |
| 7,038,528 B2 * | 5/2006 | Perotto | 327/536 |
| 7,122,996 B1 | 10/2006 | Huang | |
| 7,142,039 B2 * | 11/2006 | Cheung et al. | 327/536 |
| 7,253,594 B2 * | 8/2007 | Paul et al. | 323/268 |
| 7,737,669 B2 * | 6/2010 | Jain | 323/272 |
| 2002/0135338 A1 * | 9/2002 | Hobrecht et al. | 323/272 |
| 2006/0186865 A1 | 8/2006 | Placa et al. | |
| 2006/0192541 A1 | 8/2006 | Hackner et al. | |

OTHER PUBLICATIONS

Whitaker, J.C. (2006). "Microelectronics" (2nd ed.). Ch. 7, pp. 6-7. Boca Raton, FL: CRC Press.*

* cited by examiner

*Primary Examiner* — Adolf Berhane
*Assistant Examiner* — Fred E Finch, III
(74) *Attorney, Agent, or Firm* — Fish & Richardson P.C.

(57) ABSTRACT

A voltage regulator is disclosed. The voltage regulator includes a comparator for providing a gated output signal; and a state machine for receiving the gated output signal. The voltage regulator further includes at least one switch cell controlled by the state machine, for delivering charge to a load. Accordingly, a voltage regulator in accordance with the present invention yields N times (where N is an integer greater than one) the linear efficiency over typical linear regulators without requiring any external components. Therefore improved regulator efficiency is provided for low power devices.

27 Claims, 6 Drawing Sheets

VOLTAGE REGULATOR FOR AN INTEGRATED CIRCUIT

FIELD OF THE INVENTION

The present invention relates generally to integrated circuits and more specifically to voltage regulators utilized in such circuits.

BACKGROUND OF THE INVENTION

Standard linear regulators are utilized for reducing voltage on many application specific integrated circuits (ASICs) Typically, a DC-DC converter requires external components, such as inductors, which are large and expensive. The expense and size of these converters becomes more prohibitive as the devices that utilize the circuits use less power, are smaller in size and are less expensive.

Accordingly, what is desired is a voltage regulator that can be utilized in an integrated circuit and overcomes the above-described issues. The voltage regulator should be cost effective, easy to implement and adaptable to existing devices and circuits. The present invention addresses such a need.

SUMMARY OF THE INVENTION

A voltage regulator is disclosed. The voltage regulator includes a comparator for providing a gated output signal; and a state machine for receiving the gated output signal. The voltage regulator further includes at least one switch cell controlled by the state machine, for delivering charge to a load. Accordingly, a voltage regulator in accordance with the present invention yields N times (where N is an integer greater than one) the linear efficiency over typical linear regulators without requiring any external components. Therefore improved regulator efficiency is provided for low power devices.

DETAILED DESCRIPTION

The present invention relates generally to integrated circuits and more specifically to regulators utilized in such circuits. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
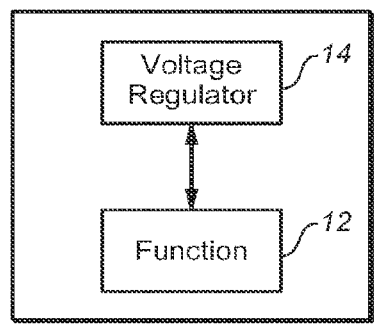
FIG. 1 is a block diagram of an integrated circuit.

Voltage regulators are utilized in a variety of integrated circuits. FIG. 1 is a block diagram of an integrated circuit 10. The integrated circuit 10 could be a digital signal processor, a microcontroller or a variety of other devices that are part of an electronic device. Many integrated circuits have one or more functional units 12 located therewithin. In addition, it is generally desirable to provide a voltage regulator 14 to maintain a stable voltage on the functional unit 12 within the circuit 10. As has been previously mentioned conventional voltage regulators require additional components such as inductors to operate effectively in an integrated circuit. These additional components add cost and size to the integrated circuit which is generally undesirable.

Accordingly, a voltage regulator that utilizes the present invention drops the input voltage by a factor of N (where N is an integer greater than one) with ideally (not actually) 100% efficiency. Therefore improved regulator efficiency is provided for low power devices.

To describe the features of the regulator in accordance with the present invention refer now to following description in conjunction with the accompanying figures.

Figure 2:
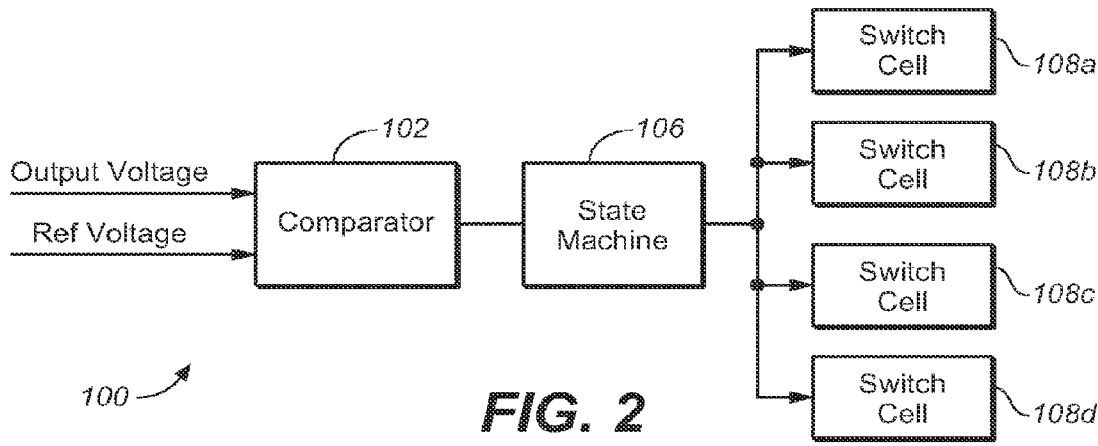
FIG. 2 illustrates a simple block diagram of an embodiment of a voltage regulator in accordance with the present invention.

FIG. 2 illustrates a simple block diagram of an embodiment of a voltage regulator 100 in accordance with the present invention. The voltage regulator 100 comprises a comparator 102 which provides input to a state machine 106. The state machine 106 in turn controls a plurality of switch cells 108a-108d.

To describe the mathematical support for the operation of the voltage regulator 100 in more detail, refer now to the following.

Mathematical Support

On the most basic level the voltage regulator 100 comprises the two equal capacitors which are configured either in series or in parallel based on the state of a plurality of switches. Initially the switches are configured so that current flows through the series combination of the two capacitors. The voltage will divide across the capacitors, such that the middle node has a voltage of $V_{applied} * C_{top}/(C_{top}+C_{bot})$, as will be described in detail later, it is important for $C_{bot}$ to equal $C_{top}$, and hence $V_{top}$ and $V_{bot}$ both equal $V_{applied}/2$.

The switches are then reconfigured so that the two capacitors are placed in parallel. Now, $V_{top}$ is shorted to $V_{bot}$. If the two capacitors are equal, the resulting voltage will be unchanged, otherwise charge will move from one capacitor to another to equalize the voltage.

A key feature of a voltage regulator in accordance with the present invention is its ability to perform higher than linear ($V_{out}/V_{applied}$) efficiency at delivering energy to the load. Efficiency is defined as energy that is put into charging the capacitors ($C_{top}$ and $C_{bot}$) divided by the amount of energy delivered to the load. In order to keep the load stable, it may be assumed there is a large capacitor ($C_{load}$) which is in parallel with the load. $C_{load}$ should be substantially larger than $C_{top}$ or $C_{bot}$.

First, charging $C_{top}$ and $C_{bot}$ is considered.

During charging, $C_{top}$ and $C_{bot}$ are configured in series, and so they can be considered to be a single capacitor ($C_{eff}$)= $C_{top}C_{bot}/(C_{top}+C_{bot})$. Also, when charging is started its reasonable to consider the voltage across both $C_{top}$ and $C_{bot}$ to be approximately $V_{out}$, and hence the voltage across $C_{eff}$ will be approximately $2V_{out}$.

When charging a capacitor through a resistive switch, the voltage will be:

$$V_{cap}(t) = (V_{applied} - V_{initial})(1 - e^{-t/RC}) + V_{initial}$$

$$I(t)CdV/dt = (V_{applied} - V_{initial})e^{-t/RC}/R$$

$$E_{cap} = \text{Integral}(V_{cap}(t)I(t)dt) = \\ ((V_{applied} - V_{initial})^2(e^{-t/RC} - e^{-2t/RC}) + \\ (V_{applied}V_{initial} - V_{initial}^2)e^{-t/RC})/Rdt$$

$$E_{cap} = -C(V_{applied} - V_{initial})^2(e^{-t/RC} - e^{-2}t/RC/2) + \\ C(V_{initial}^2 - V_{applied}V_{initial})e^{-t/RC}$$

$$E_{res} = RI(t)^2 dt = (V_{applied} - V_{initial})^2 e^{-2}t/RC/Rdt = \\ C(V_{applied} - V_{initial})^2/2e^{-2}t/RC$$

$$E = E_{res} + E_{cap} = C(V_{applied} - V_{applied}V_{initial})e^{-t/RC} | \text{ for } \\ t = \text{final-initial}$$

From $V_{cap}(t)$, we know that $1 - V_{cap}(t)/V_{applied} = e^{-t/RC}$, and since the charging is from 0 to full, the $e^{-t/RC}$ term goes to $-1$, which yields $CV_{applied}(2V_{out} - V_{applied})$. Therefore, the energy consumed is proportional to the input voltage and the difference between the output*2 and the input voltages.

Now, the energy added to $C_{load}$ is considered.

In this case, charge, but not energy is conserved in the process of charging. The charge in $C_{bot}$ and $C_{top}$ is $C_{eff} V_{applied}$. The charge in the load is $C_{load} V_{out}$. So the new voltage in the load ($V_{out}$) is $(C_{eff} V_{applied} + C_{load} V_{out})/(C_{bot} + C_{top} + C_{load})$. The amount of energy delivered to the load is $C_{load}(V_{out}^2 - V_{out}^2)/2$. (Note that the situation is actually slightly better than this because for the next charging cycle, $C_{top}$ and $C_{bot}$ are now at $V_{out}$, not $V_{out}$, which means less energy goes into re-charging them).

From looking at the equations, it can be seen that energy consumed is directly proportional to $C_{eff}$. Energy delivered is also proportional to $C_{eff}/(C_{bot} + C_{top})$. So, for a given $C_{eff}$, $C_{eff}/(C_{bot} + C_{top})$ is maximized to achieve best efficiency. Since $C_{eff} = C_{top} C_{bot}/(C_{top} + C_{bot})$.

$$K = C_{top} + C_{bot}$$

$E_{delivered}$ is proportional to $C_{top}*(K - C_{top})/K$ $$(-C_{top}^2 + KC_{top})/K$$

To find the max/min, set the derivative with respect to $C_{top}$ to 0.

$$0 = -2C_{top}/K + 1$$

$$K/2 = C_{top}$$

$$K - K/2 = C_{bot} = K/2 = C_{top}$$

Hence, to achieve maximum efficiency $C_{top}$ and $C_{bot}$ must be equal. When the efficiency of the circuit overall is calculated, assuming $C_{bot} = C_{top} = 1$ $$E_{consumed} = (V_{in}^2 - 2V_{in}V_{out})/2$$

$$E_{delivered} = ((V_{in} + KV_{out})^2/(K+2)^2 - V_{out}^2)K/2$$

$$= (V_{in}^2 + 2KV_{out}V_{in} + (K^2 - (K+2)^2)V_{out}^2)/(K+2)^2 * K/2$$

Here $K = C_{load}/C_{top}$. Assuming K is large, hence $K + 2 \sim K$ and $V_{in}^2$'s contribution can be eliminated because it is divided by K, similarly the $(K+2)^2$ in the numerator contains a component of 4 which is removed.

$$\sim (V_{out}V_{in} - 2V_{out}^2)$$

So, we have $2(V_{out}V_{in} - 2V_{out}^2)/(V_{in}^2 - 2V_{in}V_{out})$

Factoring results in: $2V_{out}(V_{in} - 2V_{out})/V_{in}(V_{in} - 2V_{out}) = 2V_{out}/V_{in}$ which provides twice the linear efficiency.

Figure 3:
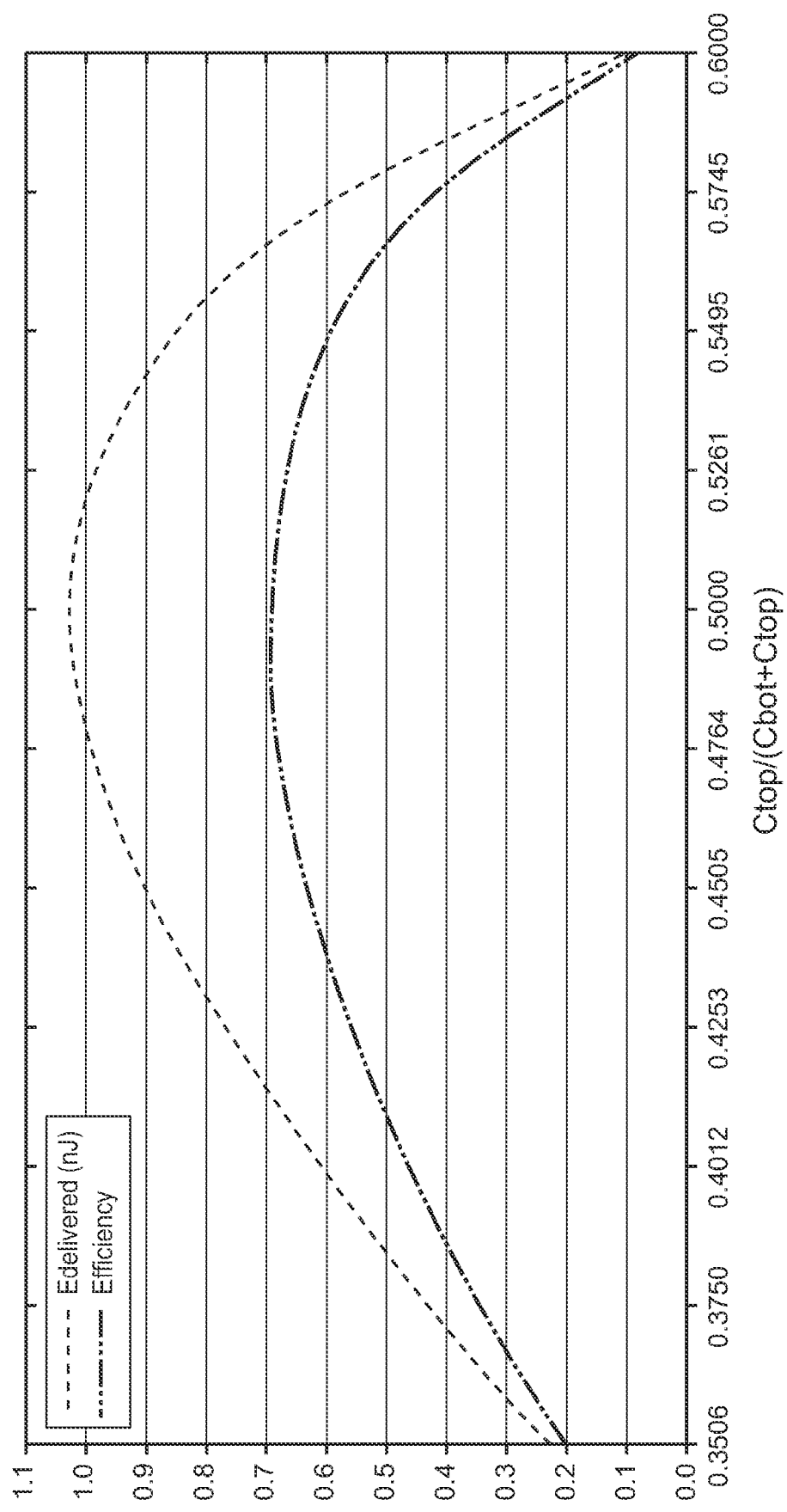
FIG. 3 is a graph of energy delivered to the load (in nJ) and efficiency, assuming a 3.3 v source, 1.2 v load, 30 nF load cap, and 2 nF of capacitance.

FIG. 3 is a graph of energy delivered to the load (in $n_J$) and efficiency, assuming a 3.3V source, 1.2V load, 30 $n_F$ load cap, and 2 nF of capacitance. The X-axis represents the capacitance of $C_{bot}$ in $n_F$ (hence $C_{top} = 2 - X$). Note that the X-axis somewhat distorts the symmetry. Although the graph does not show this, if allowed to mismatch further, charge can actually be removed from the load.

Figure 4:
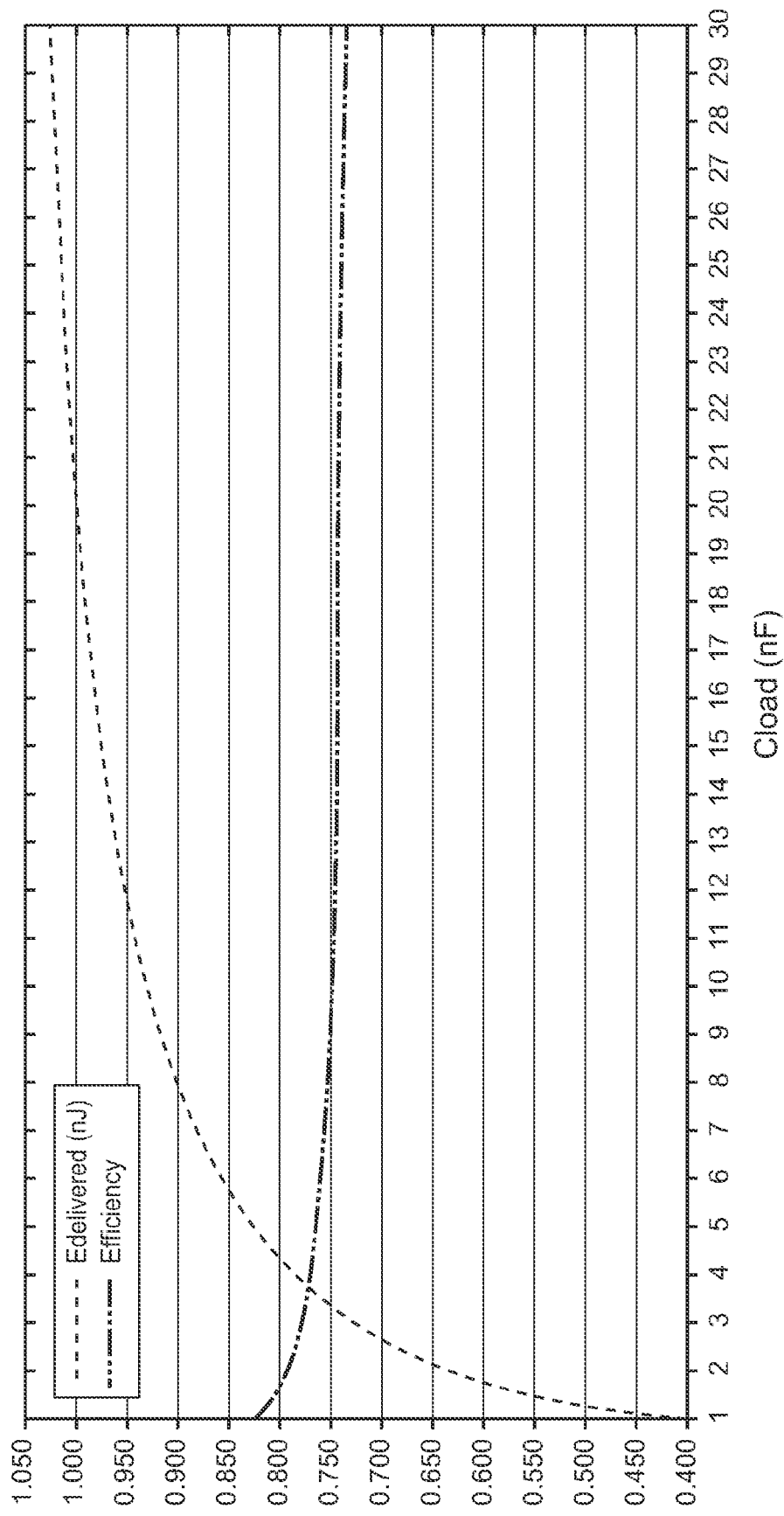
FIGS. 4 and 5 show a graph similar to FIG. 5, but keeps $C_{top}$ and $C_{bot}$ fixed at 1 nF, and varies $C_{load}$.
Figure 5:
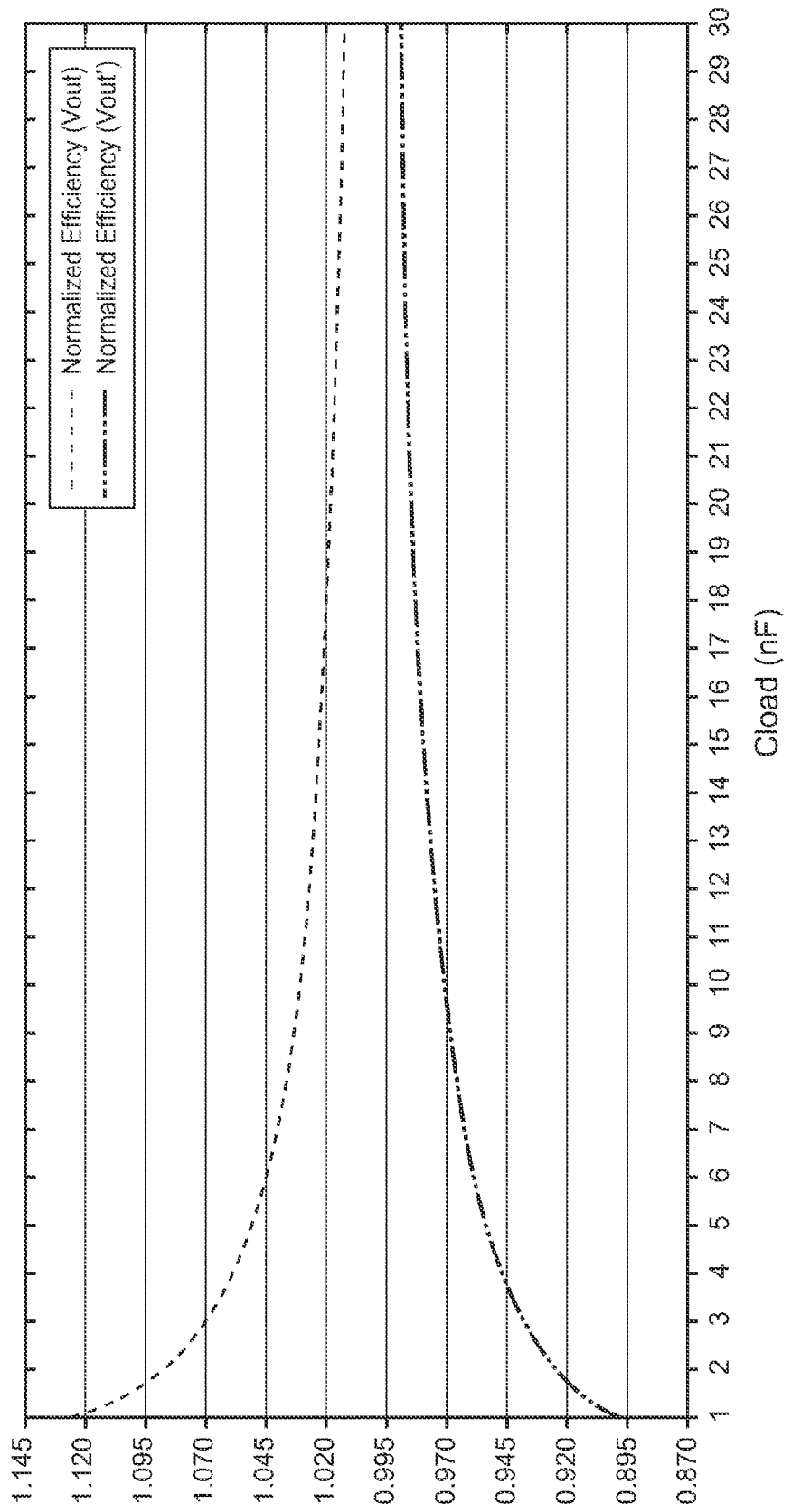

FIG. 4 shows a similar graph to that of FIG. 3, but keeps $C_{top}$ and $C_{bot}$ fixed at 1 $n_F$, and varies $C_{load}$. These graphs assume the initial state of the charge capacitors is not $2V_{out}$, but rather $2V_{out}$. Although this appears to indicate better efficiency can be achieved by using a smaller $C_{load}$. However, the energy delivered is dramatically reduced and the circuit consumes more power. Also, with a reduced $C_{load}$, $V_{out} - V_{out}$ will be substantially higher so there will be much more fluctuation of load voltage, which means that it may be better to compare ideal efficiency to $2V_{out}/V_{in}$ versus $2V_{out}/V_{in}$. Two additional curves are provided in FIG. 5, showing the efficiency normalized to $2V_{out}/V_{in}$ and $2V_{out}/V_{in}$. These graphs indicate the actual efficiency is actually going down with a small $C_{load}$.

Figure 6:
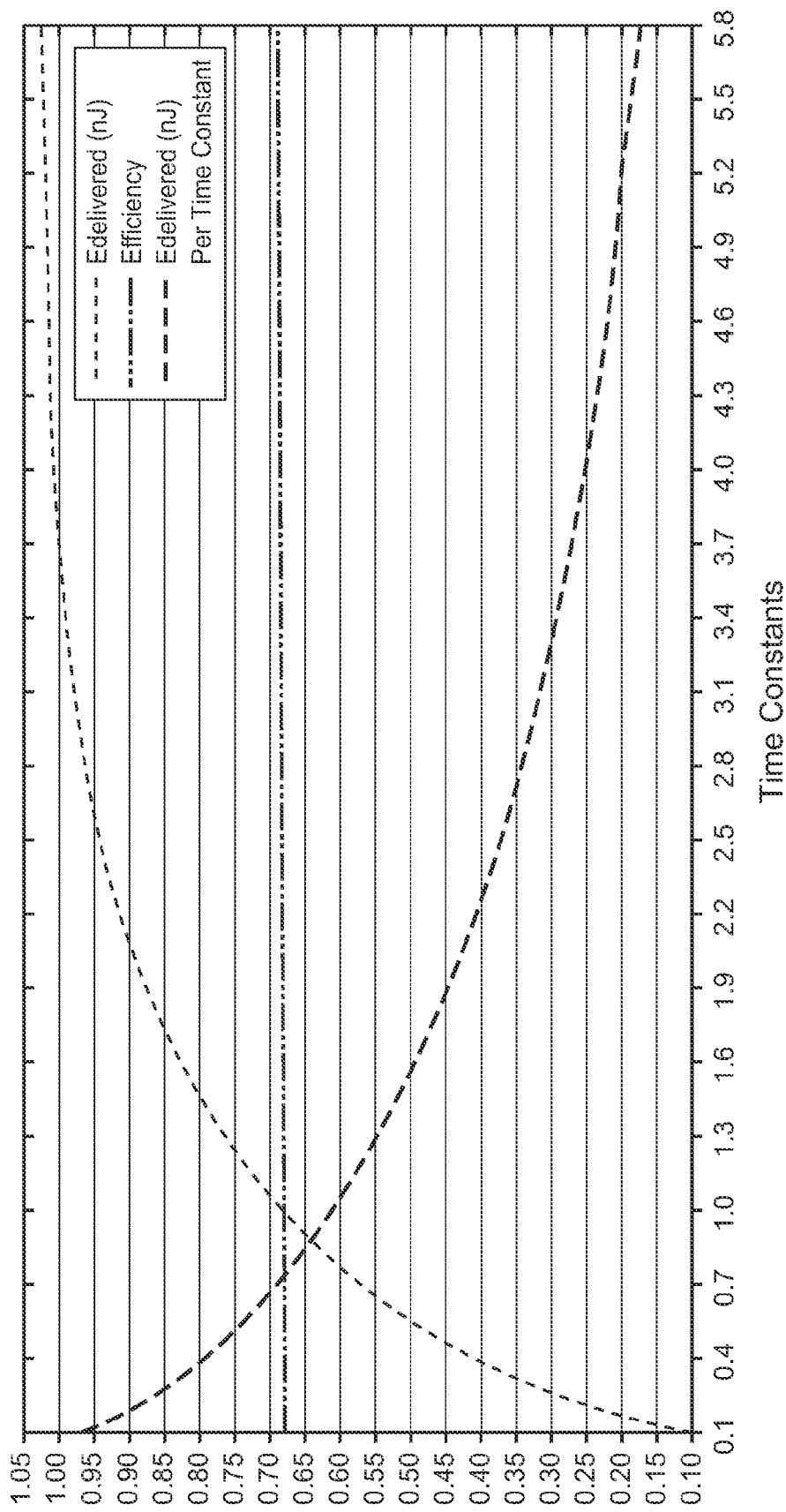
FIG. 6 shows the efficiency and energy delivery (per unit time constant) as a function of how many time constants the circuit is left in charge state.

FIGS. 4 and 5 relate to the assumption that K must be large. Another assumption has also been made, that the capacitors must be fully charged before switching out of the charge state. FIG. 6 shows the efficiency and energy delivery (per unit time constant) as a function of how many time constants the circuit is left in charge state. These graphs would indicate it is advantageous to leave it in charge state for a minimum amount of time. However, it is important to remember that these graphs do not include non-ideal effects including: time to turn on and off the switches, energy consumed turning on and off the transistors, energy consumed running the control logic faster, etc.

As shown in the math, the on-resistance has no impact (at least when dealing with an ideal circuit) on the efficiency of the regulator. However, the time it takes to "fully" charge the capacitors is proportional to the series resistance of the switches. Because charge is delivered to the load in discrete increments, the time required to charge/discharge the capacitors is directly proportional to this resistance. If the $C_{top}$ and $C_{bot}$ were increased, more charge would be delivered per discrete state, but again the charge time would be increased proportionally. It should be noted that although the charge could be delivered faster by cycling through the states before the capacitors are fully charged, a serious efficiency penalty results. The amount of energy consumed while charging is proportional to the applied voltage squared, regardless of what the voltage on the capacitors is when they are no longer being charged.

Figure 7:
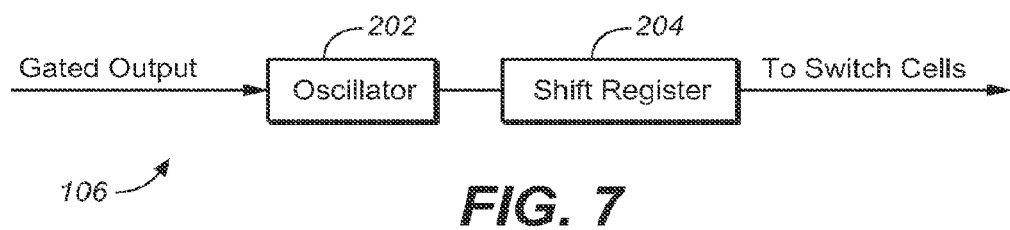
FIG. 7 is a block diagram of one embodiment of the state machine.

FIG. 7 is a block diagram of one embodiment of the state machine 106 of FIG. 2. The state machine 106 comprises an oscillator 202 coupled to a shift register 204. The oscillator 202 could be a free running oscillator, for example, or the oscillator 202 in another embodiment could be a voltage controlled oscillator (VCO). In one embodiment, for example, the shift register 204 is a one-hot 4-bit barrel shift register which is run off the oscillator 202. In another embodiment, the shift register could be for example, a 2 bit counter and decoder. In one embodiment, the output from the shift register 204 is decoded to the eight control lines by the following function:

Control <0:7> = <$SR_{bit0}, SR_{bit0}, SR_{bit2}, SR_{bit2}$,
$SR_{bit1}, SR_{bit1}, \overline{SR_{bit3}, SR_{bit3}}$>

The oscillator 202 is gated by the output of the comparator 103 (FIG. 2) which compares $V_{out}$ to a reference voltage. This simple architecture provides for a number of benefits. Since the switch cells 108a-108d deliver a discrete amount of charge, the voltage regulator 100 can be left in any state for an indefinite amount of time and will not have any impact on the load. As such, the oscillator 202 can simply be shut off if $V_{out}$ gets too high, or it can run normally to put more charge into the load.

Another benefit of the architecture is that, because there are a plurality of states based upon the plurality of bits of the shift register 204, the switch cells 108a-8d can be run and have each operating one state offset from each other. By doing this, not only is charge delivery quadrupled, but the ripple is also dramatically smoothed out, and response time is decreased when the oscillator 202 is started, because one switch cell is always ready to deliver charge. It should be understood by one of ordinary skill in the art, that although four switching cells are described, there can be any number of switch cells and their use is still within the spirit and scope of the present invention.

Figure 8:
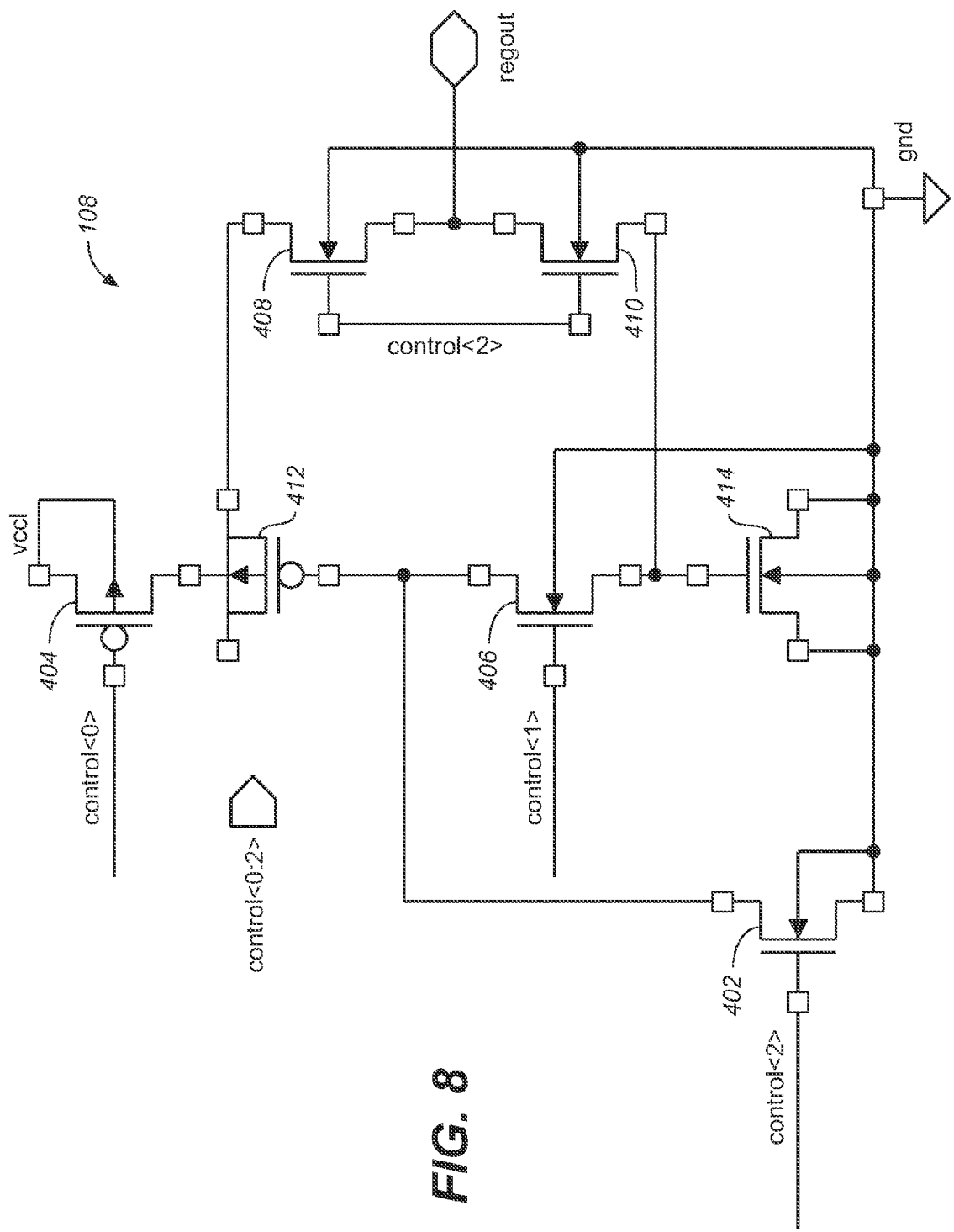
FIG. 8 is a circuit schematic of one embodiment of a switch cell.

The realization of the overall architecture of the voltage regulator 100 is accomplished with the use of a plurality of switch cells 108a-108d. FIG. 8 is a circuit schematic of one embodiment of a switch cell 108. The switch cell 108 contains five (5) switches which are implemented as transistors 402-410 and two (2) capacitors ($C_{bot}$ and $C_{top}$ respectively) which are implemented as transistors 412, 414 with their source/drains tied together. One of ordinary skill in the art readily recognizes that although switches and capacitors are implemented as transistors, they could be implemented as a variety of devices and those devices would also be within the spirit and scope of the present invention. The switch cell 108 includes three (3) control lines (one control line is tied to the gate of three of the transistors). The switch cells are utilized in conjunction with the state machine to provide charge to the load and thereby boost the output voltage of the regulator when needed.

Referring back to FIGS. 2 and 7, the control signal comprises bits <0:7>. Accordingly, three bits of the control signal are mapped to the 3 control lines of each switch cell. Also the control signals provided from the state machine 106 to a particular switch cell are in reverse order from the previous switch cell. For example, the control bits (regular order)<4:6> are mapped to lines <0:2> of the switch cell 108a and the control bits <7:5> (reverse order) are mapped to the lines <0:2> of the switch cell 108b.

Accordingly, these four switch cells 108a-108d are operating one state offset from the next. In so doing, charge delivery is quadrupled, ripple is dramatically smoothed out and response-time for the oscillator is decreased when the oscillator is started because one switch cell is always ready to deliver charge.

As the state machine 106 cycles through the states based upon the mapping and the altering of the order of control bits provided for each succeeding switch cell, four successive outputs are provided therefrom. For example, the following table illustrates the state sequence and the resulting output for each switch cell 108a-108d.

| State: | Switch Cell 1 108a <4:6> | Switch Cell 2 108d <3:1> | Switch Cell 3 108b <7:5> | Switch Cell 4 108c <0:2> |
|---|---|---|---|---|
| 1) 10011010 | 101 | 100 | 010 | 100 |
| 2) 01011001 | 100 | 101 | 100 | 010 |
| 3) 10010101 | 010 | 100 | 101 | 100 |
| 4) 10101001 | 100 | 010 | 100 | 101 |

Additional Embodiments

In this embodiment, the theoretical efficiency essentially provides approximately double the efficiency of a linear regulator for $V_{out}=0 \to V_{applied}/2$.

The addition of another capacitor could allow for triple the efficiency for $V_{out}=0 \to V_{applied}/3$ Also, the process could be reversed to produce a $V_{out}$ between $V_{applied}$ and $2V_{applied}$. The capacitors could be configured in parallel while being charged, and in series when delivering charge to the load. Efficiency would be calculated as follows:

$$E_{consumed} = (C_{bot}+C_{top})*V_{applied}^2*(V_{out}/2V_{applied}-1)$$

$$E_{delivered} = (2V_{applied}C_{bot}C_{top}/(C_{bot}+C_{top})+C_{load}V_{out})^2/(C_{bot}C_{top}/(C_{bot}+C_{top}))$$

This yields roughly $V_{out}/2V_{applied}$ efficiency. This is extremely useful for boosting the headroom for bandgaps and other similar references in low voltage.

Accordingly, a voltage regulator in accordance with the present invention yields increased linear efficiency over conventional regulators without requiring any external components. Therefore improved regulator efficiency is provided for low power devices.

Although the present invention has been described in accordance with the embodiments shown, one of ordinary skill in the art will readily recognize that there could be variations to the embodiments and those variations would be within the spirit and scope of the present invention. For example, although a one-hot 4 bit barrel shift and a 2 bit counter and decoder are disclosed as embodiments of the shift register, many other types of registers or counters could be utilized and they would be within the spirit and scope of the present invention. In another example, although a free running oscillator and a voltage control oscillator (VCO) are disclosed as embodiments of the oscillator, many types of oscillators could be utilized and they would be within the spirit and scope of the present invention. Accordingly, many modifications may be made by one of ordinary skill in the art without departing from the spirit and scope of the appended claims.

What is claimed is:

1. A voltage regulator comprising:
   a comparator including at least two inputs and configured to provide a gated output signal;
   a state machine comprising a plurality of states associated with control signals output from the state machine, wherein the state machine is coupled to the comparator and configured to receive the gated output signal; and
   switch cells controlled by the control signals from the state machine, for delivering a charge to a load,
      wherein at least two of the switch cells include control lines to receive a same control signal among the control signals from the state machine, and
      wherein each of the switch cells includes transistors and is adapted to receive less than half of all of the control signals from the state machine, and
      wherein at least two of the transistors include control lines to directly receive a same control signal among the control signals.

2. The voltage regulator of claim 1, wherein the state machine comprises:
   a shift register; and
   an oscillator for activating the shift register based upon the gated output signal.

3. The voltage regulator of claim 2, wherein the register comprises a one-hot 4-bit barrel shift register.

4. The voltage regulator of claim 3, wherein the switch cells comprise four switch cells.

5. The voltage regulator of claim 4, wherein the state machine provides control bits that are mapped onto the control lines of the four switch cells such that each switch cell is operating one offset from the next.

6. The voltage regulator of claim 2 wherein the register comprises a 2-bit counter and decoder.

7. The voltage regulator of claim 2, wherein the oscillator comprises a free running oscillator.

8. The voltage regulator of claim 2, wherein the oscillator comprises a voltage controlled oscillator.

9. The voltage regulator of claim 1, wherein the switch cells comprise:
   a plurality of switches; and
   first and second capacitive elements coupled to the plurality of switches wherein the first and second capacitive elements are of equal capacitance.

10. The voltage regulator of claim 9, wherein a voltage is divided across the first and second capacitive elements when the first and second capacitive elements are in series, and wherein a voltage across the first and second capacitive elements is unchanged when the first and second capacitive elements are in parallel.

11. The voltage regulator of claim 9, wherein the first and second capacitive elements comprises first and second transistors coupled as capacitors.

12. The voltage regulator of claim 1, wherein a number of control signals received at each of the switch cells is equal to three.

13. A device comprising:
   a functional unit; and
   a voltage regulator coupled to the functional unit, the voltage regulator comprising a comparator including at least two inputs and configured to provide a gated output signal; a state machine comprising a plurality of states associated with control signals output from the state machine, wherein the state machine is coupled to the comparator and configured to receive the gated output signal; and switch cells controlled by the control signals from the state machine, for delivering a charge to a load of the functional unit, wherein at least two of the switch cells include control lines to receive a same control signal among the control signals from the state machine, and wherein each of the switch cells includes transistors and is adapted to receive fewer than all of the control signals from the state machine, wherein at least two of the transistors include control lines to directly receive a same control signal among the control signals, and wherein the switch cells are adapted to operate one state offset from a next state based on digital combinations represented by the control signals from the state machine.

14. The device of claim 13, wherein the state machine comprises:
   a shift register; and
   an oscillator for activating the shift register based upon the gated output signal.

15. The device of claim 14, wherein the register comprises a one-hot 4-bit barrel shift register.

16. The device of claim 15, wherein the switch cells comprise four switch cells.

17. The device of claim 14, wherein the register comprises a 2-bit counter and decoder.

18. The device of claim 14, wherein the oscillator comprises a free running oscillator.

19. The device of claim 18, wherein the oscillator comprises a voltage controlled oscillator.

20. The device of claim 13, wherein the switch cells comprise:
   a plurality of switches; and
   first and second capacitive elements coupled to the plurality of switches wherein the first and second capacitive elements are of equal capacitance.

21. The device of claim 20, wherein a voltage is divided across the first and second capacitive elements when the first and second capacitive elements are in series, and wherein a voltage across the first and second capacitive elements is unchanged when the first and second capacitive elements are in parallel.

22. The device of claim 20, wherein the plurality of switches comprise a plurality of transistors and the first and second capacitive elements comprises first and second transistors coupled as capacitors.

23. The voltage regulator of claim 13, wherein a number of control signals received at each of the switch cells is less than half of all of the control signals from the state machine.

24. A circuit comprising:
   a comparator including at least two inputs and configured to provide an output signal;
   a state machine comprising a plurality of states associated with control signals output from the state machine, wherein the state machine is coupled to the comparator and configured to receive the output signal and generate control signals based on the plurality of states; and
   switch cells controlled by the control signals to deliver a charge, the switch cells including transistors and capacitors, the transistors including gates to receive the control signals to cause the capacitors to couple to each other in series based on first values of the control signals and couple to each other in parallel based on second values of the control signals, wherein three of the transistors include control lines to receive a same control signal among the control signals, and the state machine is adapted to provide fewer than half of all of the control signals to each of the switch cells.

25. The circuit of claim 24, wherein the capacitors have a same capacitance value.

26. The circuit of claim 24, wherein each of the switch cells includes two capacitors.

27. The circuit of claim 26, wherein each of the switch cells includes five transistors in addition to the two capacitors.

* * * * *

UNITED STATES PATENT AND TRADEMARK OFFICE
CERTIFICATE OF CORRECTION

PATENT NO. : 8,115,462 B2
APPLICATION NO. : 11/765805
DATED : February 14, 2012
INVENTOR(S) : Daniel Meyer It is certified that error appears in the above-identified patent and that said Letters Patent is hereby corrected as shown below:

Column 1, Line 14 in the Specification, after "(ASICs)" insert -- . --.

Column 3, Line 3 in the Specification, delete "($V_{applied}$-$V_{intial}$)" and insert -- ($V_{applied}$-$V_{initial}$) --.

Column 3, Lines 10-11 in the Specification, delete:

" $E_{cap} = -C(V_{applied} - V_{initial})^2 (e^{-t/RC} - e^{-2}t/RC/2) + C(V_{initial}^2 - V_{applied}V_{initial})e^{-t/RC}$ "

and insert

-- $E_{cap} = -C(V_{applied} - V_{initial})^2 (e^{-t/RC} - e^{-2t/RC}/2) + C(V_{initial}^2 - V_{applied}V_{initial})e^{-t/RC}$ --.

Column 3, Lines 13-14 in the Specification, delete:

" $E_{res} = RI(t)^2 dt = (V_{applied} - V_{initial})^2 e^{-2}t/RC/Rdt = C(V_{applied} - V_{initial})^2 / 2e^{-2}t/RC$ "

and insert

-- $E_{res} = RI(t)^2 dt = (V_{applied} - V_{initial})^2 e^{-2t/RC} / Rdt = C(V_{applied} - V_{initial})^2 / 2e^{-2t/RC}$ --.

Column 3, Lines 15-16 in the Specification, delete:

" $E = E_{res} + E_{cap} = C(V_{applied} - V_{applied}V_{initial})e^{-t/RC} |$ for $t$=final-initial "

and insert

-- $E = E_{res} + E_{cap} = C(V_{applied}^2 - V_{applied}V_{initial})e^{-t/RC} |$ for $t$=final-initial --.

Column 3, Line 53 in the Specification, after "$C_{bot}=C_{top}=1$" insert -- . --.

Signed and Sealed this
Twenty-fourth Day of April, 2012

David J. Kappos
*Director of the United States Patent and Trademark Office*

Column 3, Line 65 in the Specification, delete:

" $2(V_{out}V_{in} - 2V_{out}^2)/(V_{in} - 2V_{in}V_{out})$ "

and insert

-- $2(V_{out}V_{in} - 2V_{out}^2)/(V_{in}^2 - 2V_{in}V_{out})$ --.

Column 5, Line 41 in the Specification, delete "(regular order)<4:6>" and insert
-- (regular order) <4:6> --.

Column 6, Lines 3-7 in the Specification, delete:

"In this embodiment, the theoretical efficiency essentially provides approximately double the efficiency of a liner regulator for $V_{out} = 0 \rightarrow V_{applied}/2$.

The addition of another capacitor could allow for tripe the efficiency for $V_{out} = 0 \rightarrow V_{applied}/3$"

and insert:

-- In this embodiment, the theoretical efficiency essentially provides approximately double the efficiency of a liner regulator for $V_{out} = 0 \rightarrow V_{applied}/2$. The addition of another capacitor could allow for triple the efficiency for $V_{out} = 0 \rightarrow V_{applied}/3$. --.